UNITED STATES PATENT OFFICE.

ATWATER E. BROCKETT, OF BRANFORD, CONNECTICUT, ASSIGNOR TO LEMIRA H. BROCKETT, OF SAME PLACE.

BASE FOR PAINTS.

SPECIFICATION forming part of Letters Patent No. 291,142, dated January 1, 1884.

Application filed December 18, 1882. (No specimens.)

*To all whom it may concern:*

Be it known that I, ATWATER E. BROCKETT, of Branford, in the county of New Haven and State of Connecticut, have invented a certain new and useful Improvement in a Base for a Paint or Covering, of which the following is a specification.

The object of this improvement is to make a strong, durable, and elastic material for the base for a paint capable of standing all changes of heat and cold without blistering, melting, or cracking, and adapted to yield when the article to which it is applied expands and contracts under changes of temperature, thereby affording a perfect protection to the article to which it is applied.

To this end my improvement consists in a base for a paint composed of pine-tar or Stockholm tar, caoutchouc gum, gutta-percha gum, gum-shellac, gum-copal or copal (oil) varnish, and linseed-oil combined in certain proportions, and in a manner hereinafter described.

In carrying out my improvement, I preferably proceed as follows: I take two boiling-kettles of suitable capacity. In one I place about twelve gallons of linseed-oil, either raw or boiled, and heat to about the boiling-point. In the other I place about twenty-six gallons of redistilled and strained pine-tar or Stockholm tar and boil the same slowly until all water is evaporated. I now raise the temperature of the tar and add about three pounds of caoutchouc gum, which may be advantageously cut in small pieces or chips—say, of about one-quarter of an inch in thickness and an inch or two long. I raise the temperature of the tar to a degree which will melt the caoutchouc. When the caoutchouc gum becomes soft and stringy, I add about three pounds of gutta-percha, cut into small pieces—say about the same size as the caoutchouc chips—and continue boiling until all these ingredients become thoroughly liquefied and amalgamated. After this is accomplished I allow the temperature to fall to about the boiling-point of water, and then introduce about six pounds of gum-shellac, and an amount of gum, and about one gallon of copal (oil) varnish. I may use gum-copal instead of copal (oil) varnish, and in such case it will preferably be broken up in small pieces and introduced just before the gum-shellac, and while the temperature is high enough to liquefy it. The mass should be stirred until the gum-copal or copal (oil) varnish and gum-shellac are thoroughly incorporated with the other ingredients. The temperature is lessened, so that the strength of the gum-shellac will not be impaired. The caoutchouc-gum can, before its introduction, be dissolved by the use of benzine, ether, or analogous materials, and the gutta-percha by turpentine or its equivalent; but as these solvents are very volatile, I cannot bring the mass of ingredients to the desired degree of heat without incurring some danger of their taking fire; hence I prefer not to use them. When the mass has become perfectly amalgamated and homogeneous, I pour into the mass the linseed-oil heated to about the same temperature as the mass of other ingredients. It is important that this should be done slowly to avoid precipitation ensuing, and the mass should be constantly stirred meanwhile and until the whole mass is cooled down to about one hundred and ten degrees, or below scalding.

I will remark that it is of cardinal importance, in order to make this base for a paint successfully, that each of its ingredients should in its preparation be brought to a degree of heat higher than that which it will be subjected to in use from the rays of the sun or ordinary artificial heat, so that it will not melt or blister when exposed to the rays of the sun or the other heat to which it will be subjected, nor will crack or break in winter. Being composed of elastic materials, it will not be injuriously affected by the expansion and contraction of the materials to which it is applied, nor even by the bending of the same. It is, moreover, very strong and durable, and it will not evaporate save in the natural process of drying. Mixed with white lead and with color to give it the desired shade, this base forms an admirable house-paint, both for inside and outside work, and a serviceable paint for marine work. It may also be used on other work, both wood and metal. It forms a very superior protection to the articles on which it may be used, owing to its strength and durability, as well as its adaptability to expand, contract, and change form with such articles. This base may be used in connection with any suitable paint materials.

What I claim as my invention, and desire to secure by Letters Patent, is—

The base for a paint made of pine-tar or Stockholm tar, caoutchouc gum, gutta-percha, gum-shellac, gum-copal or copal (oil) varnish, and linseed-oil, or their equivalents, made substantially as specified.

A. E. BROCKETT.

Witnesses:
T. J. KEANE,
JAMES R. BOWEN.